Nov. 7, 1961 SHIGETADA FUKUOKA 3,007,385
CAMERA FILM ADVANCING AND SHUTTER OPERATING MECHANISM
Filed June 2, 1959
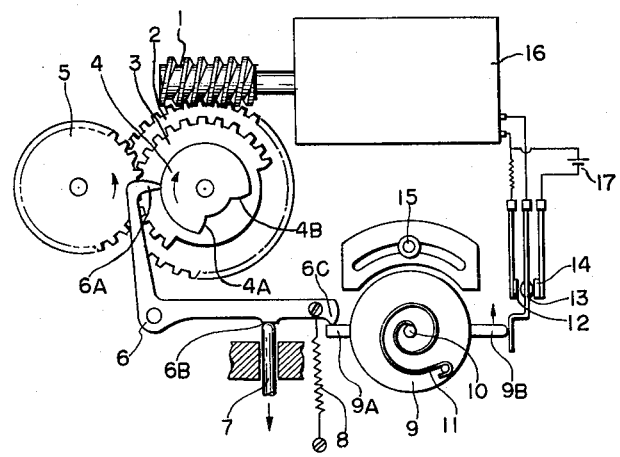
INVENTOR.
SHIGETADA FUKUOKA
BY
ATTORNEY

3,007,385
CAMERA FILM ADVANCING AND SHUTTER OPERATING MECHANISM
Shigetada Fukuoka, Tokyo, Japan, assignor to Nippon Kogaku K.K., Tokyo, Japan, a corporation of Japan
Filed June 2, 1959, Ser. No. 817,660
Claims priority, application Japan Jan. 30, 1959
4 Claims. (Cl. 95—31)

The conventional automatic film winding device in cameras for continuous photography is usually a mechanism executing a cycle consisting of a film winding and shutter cocking portion, hereinafter called the "winding" interval, and a portion during which no film is advanced, hereinafter called the "stopped winding" interval, while the drive motor rotates. Obviously, the shutter should initiate and complete the exposure movement during the stopped winding interval. Where the ratio of the number of revolutions of the motor required for the winding interval to the number of revolutions of the motor during the stopped winding portion is constant, when the speed of the motor is increased to reduce the photographing, or exposure, interval, not only will the time for the winding portion become shorter but simultaneously the stopped winding interval will also become shorter, and may become so short that film feed will begin before the shutter completes its exposure movement. The longer the exposure time in seconds, the longer the stopped winding time must be. In single-lens reflex cameras in which the movement of the reflector into and out of the photographic light path is substantially instantaneous, or in which the reflector is retained out of such path for a succession of exposures, no extension of the stopped winding interval for such movement is required. Where, however, the time for such movement of the reflector is not substantially instantaneous with the initiation and termination of an exposure, the stopped winding interval will have to be extended by the time required for such reflector motion. Thus, it is necessary to vary the stopped winding interval independently of the winding interval. The present invention is to solve the above mentioned problem.

A clear concept of the scope and purpose of this invention may be obtained from the following description taken in connection with the attached drawing which is a schematic showing an illustrative embodiment of the present invention.

In the sole figure, 1 to 8 are elements of a motor-driven continuous photographing mechanism. A disk 3, having gear teeth cut into it over a portion of its circumference while recessed and without gear teeth in the remaining portion of its circumference, and a cam 4 are affixed to a gear 2 to which rotation is transmitted from a motor 16 through a reduction gear 1. A gear 5 is connected by means of a joint or the like to a shaft for winding the shutter and film in the camera. When the gear teeth of the disk 3 are in mesh wtih those of the gear 5, film will be advanced by the power of the motor 16. In the portion of disk 3 which is without teeth and recessed, no power will be transmitted to the winding shaft.

The cam 4 will operate the shutter button through a lever 6 during the phase wherein no power is transmitted to the gear 5. That is to say, when end region 6A of pivoted lever 6 travels along the descending portion 4A of the cam due to the force of the spring 8, the part 6B of the lever will push a bar 7 connected with the shutter button of the camera downwardly as shown by the arrow axially aligned with bar 7. When the cam follower region 6A of the lever 6 is pushed up by the ascending portion 4B of the cam, the shutter button will restore to its unoperated position. 9 is a flywheel which can rotate about a shaft 10. 11 is a spring which is anchored at one end to the flywheel 9 and at the other end to the shaft 10. When the shaft 10 is wound clockwise, a force tending to prevent the flywheel 9 from rotating counter-clockwise will act. 12, 13 and 14 are electric contact pieces of which contact 13 is biased normally to engage contact 12. When the contact piece 13 is in contact with the contact piece 14, the motor 16 will rotate. When contact 13 separates from contact 14, the motor will be disconnected from the electric source 17. When the contact piece 13 comes into contact with the contact piece 12, an electric brake will act. In the illustrated state, a pin 9B projecting from the flywheel keeps the contact 13 in engagement with the contact 14. However, when the pin 9B rotates through a predetermined angle, it will separate the contact 13 from the contact 14 and will bring said contact 13 into engagement with the contact 12. 15 is a stop member for the pin 9B and is spatially adjustable to restrict the angle of rotation of the flywheel. In the illustrated embodiment, the connection of the contacts 12, 13 and 14 and the electric source 17 for the motor 16 is such that, when the inertia body or flywheel 9 rotates in the direction indicated by the arrow above pin 9B, the supply of electricity to the motor is interrupted and an electric braking effect is applied to the motor. However, means varying the speed of the motor by inserting or removing a resistance, or by varying any other wiring, can be adopted.

The drawing shows the contacts 13 and 14 in contact with each other, the motor rotating and the gear 3 driving the gear 5 to advance film and cock the shutter. It will be noted that the recessed or valley portion of cam 4 between sloped portions 4A and 4B is of lesser circumferential extent than the recessed and non-toothed portion of disk 3, and that the midpoints thereof are on the same radius. When the winding finishes and the cut-away region of disk 3 is reached, power will no longer be transmitted to the gear 5. When the part 6A of the lever travels along the descending portion of the cam 4, the shutter will be released. If the motor continues to rotate as it is, the valley or recessed portion of the cam will pass, the lever will be pushed up by the cam ascending region 4B, the shutter button will be restored, the gear teeth of disk 3 and of gear 5 will then mesh with each other, the winding will be resumed and thus continuous photographing will be possible. Obviously, the shutter must have completed its exposure movement before the teeth of disk 3 and those of gear 5 mesh with each other. Therefore, the shutter time to be used will be limited.

However, in the present mechanism, at the same time as the lever 6 is actuated to release the shutter, the other end 6C of the lever will strike pin 9A of the flywheel and will rotate the flywheel counterclockwise and therefore the pin 9B, which normally presses contact 13 against contact 14, will be moved away from contact 13 which, under its spring bias, now engages contact 12 to decelerate or stop the motor. When the flywheel has rotated by a certain angle due to inertia and has been returned to the original position by the force of the spring 11, the pin 9B will displace contact 13 to engage contact 14, and the motor will begin to rotate at its full speed, the shutter button will restore, and the film advanced and the shutter cocked.

The time taken to decelerate or stop the motor depends on the time required for the oscillatory motion of the flywheel, and can be varied by adjusting the amount spring 11 is wound by rotating the shaft 10. Further, if the stop pin 15 is so positioned that the pin 9B will collide with it and rebound, such time can be varied by adjusting the position of the stop pin 15.

What I claim is:
1. A mechanism for cyclically feeding film while cocking the exposure shutter and stopping the film feed while the shutter is making an exposure, comprising an electric motor, switching means for connecting the motor to a source of electrical potential, a motor driven gear, a disk and a cam integral with the motor driven gear, the disk having a peripheral region with gear teeth and having the remainder of its peripheral region recessed to a depth at least equal to the height of the gear teeth of its toothed region, a gear of the shutter and film driving mechanism for meshing with the toothed region of the disk, the cam having a recessed peripheral region coaxial to a predetermined radius of the disk with the recessed region of the disk, a spring biased two-armed lever of which one end rides on the periphery of the cam, shutter release means biased against an intermediate region of one arm of the lever for depressing the shutter to make an exposure when the one end of the lever rides in the recessed region of the cam and the gear of the shutter and film driving mechanism is traversed by the recessed region of the disk, and means interconnecting the other end of the lever and the switching means for controlling the time and duration of the disconnection of the motor from the source.

2. The mechanism according to claim 1 in which the arcuate extent of the recessed region of the cam is less than the arcuate extent of the recessed portion of the disk.

3. The mechanism according to claim 1 in which the interconnecting means includes a rotatable shaft, a flywheel rotatable on the shaft, a coil spring having one end anchored in the shaft and its other end in a peripheral region of the flywheel and biasing the flywheel for rotation in a predetermined direction, a pair of diametrically opposite pins projecting radially from the flywheel, the switching means includes a spring contact between two fixed contacts with the spring contact biased to engage the fixed contact opening the circuit from the source to the motor, one of the diametrically opposite pins normally engaging the spring contact to press it against the fixed contact closing the circuit from the source to the motor, the other of the diametrically opposite pins bearing against such other end of the lever, and a stop adjustably positionable along and in the path of one of the diametrically opposite pins so that when such other of the diametrically opposite pins is depressed by the lever as the one lever end rides in the recessed cam region to rotate the flywheel in the direction opposite to the bias of the coil spring, such one of the diametrically opposite pins releases the spring contact permitting it to close on the fixed contact opening the circuit from the source to the motor.

4. The mechanism according to claim 3 in which the adjustable stop is positioned in the path of one of the diametrically opposite pins at a distance from the normal position thereof which is less than the distance the lever depresses one of the diametrically opposite pins.

References Cited in the file of this patent

UNITED STATES PATENTS 2,398,133    Cronholm -------------- Apr. 9, 1946